United States Patent [19]

Ona et al.

[11] 4,404,035

[45] Sep. 13, 1983

[54] COMPOSITIONS COMPRISING A WAX AND AN ORGANOPOLYSILOXANE

[75] Inventors: Isao Ona, Sodegaura; Masaru Ozaki; Yoichiro Taki, both of Ichihara, all of Japan

[73] Assignee: Toray Silicone Company, Ltd., Tokyo, Japan

[21] Appl. No.: 358,161

[22] Filed: Mar. 15, 1982

[30] Foreign Application Priority Data

Mar. 19, 1981 [JP] Japan .................................. 56-39902

[51] Int. Cl.$^3$ ........................ C08H 9/06; C08L 91/06
[52] U.S. Cl. .................................... 106/271; 106/10; 252/8.6; 524/277; 528/41
[58] Field of Search ...................................... 106/3–11, 106/270, 271; 528/41; 252/8.6

[56] References Cited

U.S. PATENT DOCUMENTS

| | | | |
|---|---|---|---|
| 2,823,218 | 2/1958 | Speier | 528/15 |
| 3,836,371 | 9/1974 | Kokoszka | 106/10 |
| 3,890,271 | 6/1975 | Kokoszka | 106/10 |
| 3,960,574 | 6/1976 | Lee | 106/3 |

*Primary Examiner*—Theodore Morris
*Attorney, Agent, or Firm*—George A. Grindahl

[57] ABSTRACT

Improved wax compositions comprising certain hydrocarbon ester-containing organopolysiloxanes are disclosed. These compositions have improved shelf stability and excellent luster-bestowing properties, lubricating properties and water-repellent properties. They are useful in textile manufacture, such as treating sewing threads and textile warps, and for protecting surfaces, such as furniture surfaces and automobile surfaces.

5 Claims, No Drawings

COMPOSITIONS COMPRISING A WAX AND AN ORGANOPOLYSILOXANE

BACKGROUND OF THE INVENTION

The present invention relates to a composition comprising a wax and an organopolysiloxane. More specifically, the present invention relates to a composition which has excellent lubricating properties, luster-bestowing properties and water-repellant properties and comprises a homogeneous mixture of a wax and an organopolysiloxane bearing at least one silicon-bonded hydrocarbon ester group.

Waxes are themselves lubricious and are used as lubricants for machine sewing threads. They have come to be widely used as fluff bindings and as lubricants of warps when weaving textiles, or as polishes for automobiles and furniture, etc. Furthermore, as lubricants for machine sewing thread or as protecting agents for protecting and polishing the surfaces of automobiles and funiture, mixtures of waxes and dimethylpolysiloxane oils or alkyl aralkyl polysiloxane oils have come to be used. Moreover, in U.S. Pat. Nos. 3,836,371 and 3,890,271 a composition of waxes and the condensation product of a hydroxyl-endblocked dimethylpolysiloxane and an aminoalkyltrialkoxysilane has been proposed. In U.S. Pat. No. 3,960,574 a composition of waxes and an organopolysiloxane containing carboxylic acid groups is proposed.

When a composition of waxes and dimethylpolysiloxane oil is used as a lubricant for machine sewing thread, it has the drawbacks that the components are incompatible, the coating easily falls off because it is fragile and stops up the eye of the needle, and the thread breaks easily. Also the compositions proposed in the above-listed U.S. patents have the drawbacks that the compatibility of the organopolysiloxanes and waxes is poor, so when used as a polish for automobiles, the polish tends to be removed when hit by rain.

The present invention eliminates the above drawbacks. That is, it offers a wax and organopolysiloxane composition of high compatibility, and which excels in lubricity, luster-bestowing properties, and water repellency, and these characteristics are very durable.

BRIEF SUMMARY OF THE INVENTION

It is an object of this invention to provide a mixture of a wax and an organopolysiloxane which does not separate into two layers. It is a further object of this invention to provide a coating composition which is resistant to removal from a substrate to which it is applied. It is another object of this invention to provide a water-resistant polish composition. It is also an object of this invention to provide an improved thread lubricant composition.

These objects, and others which will become obvious after considering the following specification and appended claims, are obtained by mixing a wax and certain organopolysiloxanes bearing hydrocarbon ester groups, optionally along with non-essential components well known in the lubricant and polish art.

DETAILED DESCRIPTION OF THE INVENTION

The present invention relates to a composition comprising a homogeneous mixture of (A) from 0.5 to 99.5 parts by weight of a wax and (B) from 0.5 to 99.5 parts by weight of an organopolysiloxane having the formula $Z(R_2SiO)_m(RQSiO)_nSiR_2Z$ wherein R denotes a substituted or unsubstituted monovalent hydrocarbon group, Q denotes a hydrocarbon ester group having the formula $-R^1CO_2R^2$, Z denotes an R group or a Q group, $R^1$ denotes a divalent hydrocarbon group, $R^2$ denotes a saturated monovalent hydrocarbon group having at least 3 carbon atoms, m and n each has an average value of zero or more, the sum of m+n has an average value of from 1 to 2000, there being an average of at least one Q group per molecule of organopolysiloxane (B) and the total weight of component (A) plus component (B) being 100 parts by weight.

Component (A) of the compositions of this invention can be any well-known wax. Suitable waxes for the purpose of this invention include, but are not limited to, animal waxes such as beeswax, spermaceti, lanolin and ceramic wax; plant waxes such as carnauba wax and candelilla wax; mineral waxes such as ozocerite wax, sericin wax, Montan wax, paraffin wax and microcrystalline wax; and synthetic waxes such as oxides of paraffin wax or their esters, cane sugar-aliphatic acid ester waxes, polyol ether esters, higher alcohols-higher aliphatic acid waxes and chlorinated naphthalenes.

Component (B) of the compositions of this invention is an organopolysiloxane having the formula $Z(R_2SiO)_m-(RQSiO)_nSiR_2Z$.

In the formula for component (B) each R denotes, independently, a substituted or an unsubstituted monovalent hydrocarbon group. Examples of unsubstituted R groups include, but are not limited to, alkyl groups such as methyl, ethyl, propyl, octyl, and octadecyl; cycloaliphatic groups such as cyclohexyl; alkenyl groups such as vinyl and allyl; aryl groups such as phenyl and tolyl; and arylalkyl groups such benzyl, 2-phenylethyl and 2-phenylpropyl. Examples of substituted R groups include, but are not limited to, the above delineated groups bearing halogen substitution or cyano substitution. For optimum compatibility between the wax (A) and the organopolysiloxane (B) it is preferred that R be selected from alkyl groups and cycloaliphatic groups, and most preferably from alkyl groups. All R groups do not have to be the same.

In the formula for component (B) Q denotes a hydrocarbon ester group having the formula $-R^1CO_2R^2$. $R^1$ denotes a divalent hydrocarbon group linking a silicon atom and a $-CO_2R^2$ group. Examples of suitable $R^1$ groups include alkylene groups, which are preferred, such as $-CH_2CH_2-$, $-CH_2CH_2CH_2-$,

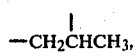

$-CH_2CH(CH_3)CH_2-$ and $-(CH_2)_4-$; alkylene arylene groups such as $-(CH_2)_2C_6H_4-$; and arylalkylene groups such as

All $R^1$ groups do not have to be the same. $R^2$ is a saturated hydrocarbon group having three or more carbon atoms. Examples of $R^2$ groups include alkyl groups, which are preferred, such as propyl, hexyl, decyl, octadecyl and myricyl; and cycloaliphatic groups such as cyclohexyl. Alkyl groups having more than 6 carbon atoms are most preferred for improved compatability between wax and organopolysiloxane.

In the formula for component (B) m and n denote number each having an average value of zero or more, such as 0, 1, 2, 10, 20, 50 and higher, with the restriction that both m and n cannot be zero simultaneously. The sum of m+n must be from 1 to 2000 and preferably from 10 to 1000. When m+n is zero the lubricity and luster properties are poor and when it exceeds 2000 the compatability of the organopolysiloxane component with the wax component declines.

In the formula for component (B) Z denotes an R group or a Q group, hereinabove delineated. When m has a value of zero at least one Z must be a Q group because the organopolysiloxane component must contain at least one Q group in the composition of this invention.

Organopolysiloxanes having the above formula have improved compatability with waxes; however, a highly preferred organopolysiloxane component (B) for the compositions of this invention has the formula

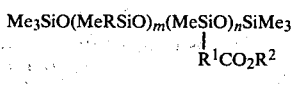

where m and n each has an average value of at least one and the sum of m+n has an average value of from 10 to 1000. In this highly preferred organopolysiloxane component Me denotes the methyl radical and R, $R^1$ and $R^2$ are the preferred alkyl groups, alkylene groups and alkyl groups, respectively, denoted above. These highly preferred organopolysiloxanes provide particularly excellent luster-bestowing properties, lubricating properties and water-repellency properties to the compositions of this invention when used therein as component (B). This is especially noticeable when the highly preferred organopolysiloxane is used with partially oxidized paraffin wax, which is called "oxidized wax" and which is cheap and has excellent luster and water resistance, or with their esters, or with carnauba wax, beeswax, microcrystalline wax, higher alcohols-higher aliphatic acid ester waxes and paraffin waxes, which particularly excel in luster.

The organopolysiloxane component (B) can be prepared by well-known methods. For example a suitable organohydrogenpolysiloxane can be reacted with a hydrocarbon ester which is unsaturated in its acid portion, such as $CH_2=CHCH_2CO_2R^2$, in the presence of a hydrosilylation catalyst, such as chloroplatinic acid. U.S. Pat. No. 2,823,218 is hereby incorporated herein to further show how to prepare component (B).

The compositions of this invention can be prepared by mixing from 0.5 to 99.5 parts by weight of the wax component (A) and from 0.5 to 99.5 parts by weight of the organopolysiloxane component (B) with the total weight of (A)+(B) being 100 parts by weight. Preferably the amount of each component ranges from 10 to 90, and most preferably from 20 to 80 parts by weight.

The present composition is obtained merely by heating and mixing component (A) and component (B) above the melting point of the wax. When used as a solution, a solvent common to both component (A) and component (B) should be used. When used as an emulsion, components (A) and (B) should be mixed with an emulsifying agent, such as ester sulfate salts of higher alcohols, alkyl benzenesulfonate, or polyoxyalkylene adducts of higher aliphatic acids, and the mixture heated above the melting point of the wax, emulsified while adding water slowly, and cooled rapidly.

Besides components (A) and (B), various well-known additives can be combined in the composition of the present invention according to its uses. For example, when used as a lubricant for machine sewing threads, small amounts of fluid paraffin and trimethylsiloxy-endblocked dimethylpolysiloxane oil can be used, or antistatic agents of ester phosphate systems may be used with it in small amounts. When used as polishes for automobiles and furniture, perfumes, solvents, water, abrasives, coloring agents, anti-rust agents, or surfactants may also be added. The composition of the present invention is useful as a lubricant for machine threads, a lubricant for warps when weaving textiles, a protective coating agent to preventing rust, or as a polish for automobiles and furniture.

The following examples are disclosed to further teach how to practice this invention. Me denotes the methyl group. All parts and percentages are by weight, unless otherwise stated. Viscosities were measured at 25° C.

EXAMPLE 1

OX-1949 wax manufactured by Nippon Seiro K.K., obtained by partially oxidizing paraffin wax (35 parts) and the organopolysiloxane expressed by the following structural formula

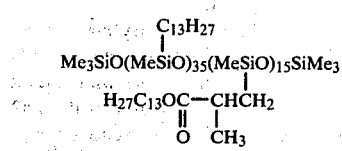

and having a viscosity of 400 cst (65 parts) were placed in a beaker, and mixed by a stirrer with four paddles for 60 minutes while heating to 90° C. After it had been uniformly mixed, it was slowly cooled to room temperature while stirring. This liquid mixture was divided into two equal parts, one of which was placed in a transparent glass bottle and left alone at room temperature for 20 days. Then the storage stability of organopolysiloxane and wax was investigated by looking for separation of the components. The remaining part was dissolved in a solvent mixture of toluene and ethanol (volume ratio 5:1), and a commercial 100% polyester spun machine sewing thread was treated with that solution, causing 8% of the composition to adhere as solids. Next, a test of sewability as machine thread was conducted with power-driven machines for industrial use.

As a comparison example, a trimethylsiloxy-endblocked dimethylpolysiloxane oil (100 cst) was used in the place of the above organopolysiloxane, and exactly the same test as above was carried out. The results are shown in Table I. As that table shows, the present composition was extremely good, in that compatibility was good and there was no separation, and there was little thread breakage of machine thread due to eye-stoppage.

TABLE I

| Sample | Stability when left alone | Sewability test (frequency of thread breaks during sewing of 100 m machine thread) |
|---|---|---|
| Composition of present | Uniform and no separation | No eye blockage by wax in needle eye (1 time) |

TABLE I-continued

| Sample | Stability when left alone | Sewability test (frequency of thread breaks during sewing of 100 m machine thread) |
|---|---|---|
| invention Composition of comparison examples | Transparent dimethylpolysiloxane oil released to the surface, forming two layers | Considerable eye-stoppage by wax in needle eye (4 times) |

EXAMPLE 2

Beeswax, whose primary component is myricyl palmitate ($C_{15}H_{31}CO_2C_{30}H_{61}$) (80 parts), and an organopolysiloxane with a viscosity of 600 cst which is expressed by the following formula $$Me_3SiO(Me_2SiO)_{130}(MeWSiO)_{10}SiMe_3$$

$$W = -CH_2CH_2CO_2C_{18}H_{37}$$

(20 parts) were dissolved in chloroform (900 parts) (solution A). Next, this solution was applied by brush to a black, baked acrylic coated metal panel (width 60 mm, length 120 mm, thickness 0.5 mm) manufactured by Nihon Tesuto Paneru Kogyo. After it had dried at normal temperature, the coating was wiped with a dry cloth. For purposes of comparison, in the place of the above organopolysiloxane, solutions in which the functional group (W) was changed as indicated below were used. Otherwise, it was applied to the metal panel, dried, and wiped with a dry cloth just as described above.

| Solution | W |
|---|---|
| B | $-CH_3$ |
| C | $-C_{13}H_{27}$ |
| D | $-(CH_2)_3O(C_2H_4O)_{20}(C_3H_6O)_{20}H$ |
| E | $-(CH_2)_3NH(CH_2)_2NH_2$ |
| F | $-(CH_2)_2COOH$ |
| G | $-(CH_2)_2CF_3$ |
| H | 3 parts solution A and 1 part solution B |

Next, while observing the luster of each, these test panels were arranged beneath an artificial shower connected to a water conduit and showered for a total of 20 hours, and the initial luster and water repellency, and their durability, were investigated. The results are shown in Table II.

As shown in Table II, those to which the present composition was applied had the best luster, water repellency, and durability.

TABLE II

| Solution | Evaluation[1] Luster | Water Repellency | Durability | Overall |
|---|---|---|---|---|
| A[2] | 1 | 1 | 1 | 1 |
| B[3] | 1 | 1 | 3 | 2 |
| C[3] | 1 | 3 | 3 | 2 |
| D[3] | 4 | 4 | 4 | 3 |
| E[3] | 1 | 3 | 3 | 2 |
| F[3] | 3 | 3 | 3 | 2 |
| G[3] | 4 | 3 | 4 | 3 |
| H[2] | 1 | 1 | 1 | 1 |

[1] 1 denotes Extremely Good;
2 denotes Not Very Good;
3 denotes Poor;
4 denotes Unacceptable.
[2] Composition of this invention.
[3] Comparison Composition.

That which is claimed is:

1. A composition comprising a homogeneous mixture of
   (A) from 0.5 to 99.5 parts by weight of a wax and
   (B) from 0.5 to 99.5 parts by weight of an organopolysiloxane having the formula $$Z(R_2SiO)_m(RQSiO)_nSiR_2Z$$

wherein R denotes a substituted or unsubstituted monovalent hydrocarbon group, Q denotes a hydrocarbon ester group having the formula $-R^1CO_2R^2$, Z denotes an R group or a Q group, $R^1$ denotes a divalent hydrocarbon group, $R^2$ denotes a saturated monovalent hydrocarbon group having at least 3 carbon atoms, m and n each has an average value of zero or more, the sum of m+n has an average value of from 1 to 2000, there being an average of at least one Q group per molecule of organopolysiloxane (B) and the total weight of component (A) plus component (B) being 100 parts by weight.

2. A composition according to claim 1 wherein R is an alkyl group, $R^1$ is an alkylene group and $R^2$ is an alkyl group.

3. A composition according to claim 2 wherein component (B) has the formula $$Me_3SiO(MeRSiO)_m(MeSiO)_nSiMe_3$$
$$\qquad\qquad\qquad\qquad\;\; |$$
$$\qquad\qquad\qquad\quad R^1CO_2R^2$$

wherein the average values of m and n are each at least one, the average value of m+n is from 10 to 1000 and Me denotes the methyl radial.

4. A composition according to claims 1, 2 or 3 further comprising one or more solvents for component (A) and component (B).

5. A composition according to claims 1, 2, or 3 further comprising water and one of more emulsifying agents.

* * * * *